US012553257B2

(12) United States Patent
Roup

(10) Patent No.: US 12,553,257 B2
(45) Date of Patent: Feb. 17, 2026

(54) MODULAR CYLINDER SPACERS

(71) Applicant: Schlage Lock Company LLC, Carmel, IN (US)

(72) Inventor: Austin M. Roup, Woodland Park, CO (US)

(73) Assignee: Schlage Lock Company LLC, Carmel, IN (US)

( * ) Notice: Subject to any disclaimer, the term of this patent is extended or adjusted under 35 U.S.C. 154(b) by 282 days.

(21) Appl. No.: 17/954,738

(22) Filed: Sep. 28, 2022

(65) Prior Publication Data

US 2024/0102312 A1 Mar. 28, 2024

(51) Int. Cl.
*E05B 3/00* (2006.01)
*E05B 15/16* (2006.01)
*E05B 55/00* (2006.01)

(52) U.S. Cl.
CPC .............. *E05B 3/003* (2013.01); *E05B 15/16* (2013.01); *E05B 15/1635* (2013.01); *E05B 55/005* (2013.01)

(58) Field of Classification Search
CPC .... E05B 2047/0091; E05B 3/06; E05B 3/003; E05B 15/16; E05B 15/1635; E05B 55/005; E05B 9/084; E05B 63/0056; E05B 63/006; B25G 3/00; A47B 95/02; Y10T 70/7655
See application file for complete search history.

(56) References Cited

U.S. PATENT DOCUMENTS 3,046,777 A * 7/1962 Schlage .................. E05B 3/003 70/371
3,733,865 A * 5/1973 Vorob ..................... E05B 9/084 70/451
4,342,478 A * 8/1982 Foshee .................. E05B 55/005 292/352
4,995,249 A * 2/1991 Preissler ................. E05B 9/084 70/369
5,077,994 A * 1/1992 Trull ....................... E05B 9/084 70/371
5,481,890 A 1/1996 Millman
6,532,779 B2 * 3/2003 Shen ..................... E05B 55/005 70/222
6,948,345 B1 * 9/2005 Ruan ....................... E05B 9/084 70/370

(Continued)

FOREIGN PATENT DOCUMENTS

WO WO-9310322 A1 * 5/1993 ........... E05B 1/0015

OTHER PUBLICATIONS

International Search Report; ISA/US, Commissioner for Patents; International Application No. PCT/US23/75375; Mar. 21, 2024; 4 pages.

(Continued)

*Primary Examiner* — Kristina R Fulton
*Assistant Examiner* — Emily G. Brown
(74) *Attorney, Agent, or Firm* — Taft Stettinius & Hollister LLP

(57) ABSTRACT

An exemplary access control device generally includes a mounting location, a first selected feature, a lock actuator mounted in the mounting location, and a spacer. The spacer includes a second attachment feature and a ledge. The second attachment feature is releasably coupled with the first attachment feature, and the ledge restricts movement of the lock actuator.

19 Claims, 12 Drawing Sheets

(56) References Cited

U.S. PATENT DOCUMENTS

| | | | | |
|---|---|---|---|---|
| 7,334,440 | B2 | 2/2008 | Hsueh et al. | |
| 10,844,633 | B2 * | 11/2020 | Qiu | E05B 9/08 |
| 2002/0116964 | A1 | 8/2002 | Koskela et al. | |
| 2002/0116965 | A1 * | 8/2002 | Bates | E05B 55/005 70/224 |
| 2007/0186599 | A1 * | 8/2007 | Hsueh | E05B 3/003 70/224 |
| 2008/0072634 | A1 * | 3/2008 | Don | E05B 3/003 70/101 |
| 2014/0217755 | A1 * | 8/2014 | Kom | E05B 3/00 292/336.3 |
| 2018/0187450 | A1 | 7/2018 | Lin et al. | |
| 2018/0298635 | A1 * | 10/2018 | Huang | E05B 3/065 |

OTHER PUBLICATIONS

Written Opinion of the International Searching Authority; ISA/US, Commissioner for Patents; International Application No. PCT/US23/75375; Mar. 21, 2024; 9 pages.

* cited by examiner

MODULAR CYLINDER SPACERS

TECHNICAL FIELD

The present disclosure generally relates to access control devices, and more particularly but not exclusively relates to locksets with removable and replaceable lock cylinders.

BACKGROUND

Access control devices are often provided with a lock cylinder that facilitates the operation of the access control device by an appropriate key. While there exist standard formats for lock cylinders (e.g., key-in-lever, small format interchangeable core, full size interchangeable core, and mortise), the dimensions of the lock cylinder can vary from manufacturer to manufacturer, or from product line to product line. In many conventional access control solutions, each lock cylinder type may require its own configuration of mounting device. In a lockset, for example, a first lock cylinder configuration may require a first spindle configuration and a first handle configuration, while a second lock cylinder configuration may require a second spindle configuration and/or a second handle configuration. This can lead to a need for many different combinations of configurations, which can increase inventory requirements and manufacturing costs. For these reasons among others, there remains a need for further improvements in this technological field.

SUMMARY

An exemplary access control device generally includes a mounting location, a first attachment feature, a lock actuator mounted in the mounting location, and a spacer. The spacer includes a second attachment feature and a ledge. The second attachment feature is releasably coupled with the first attachment feature, and the ledge restricts movement of the lock actuator. Further embodiments, forms, features, and aspects of the present application shall become apparent from the description and figures provided herewith.

DETAILED DESCRIPTION OF ILLUSTRATIVE EMBODIMENTS

Figure 1:
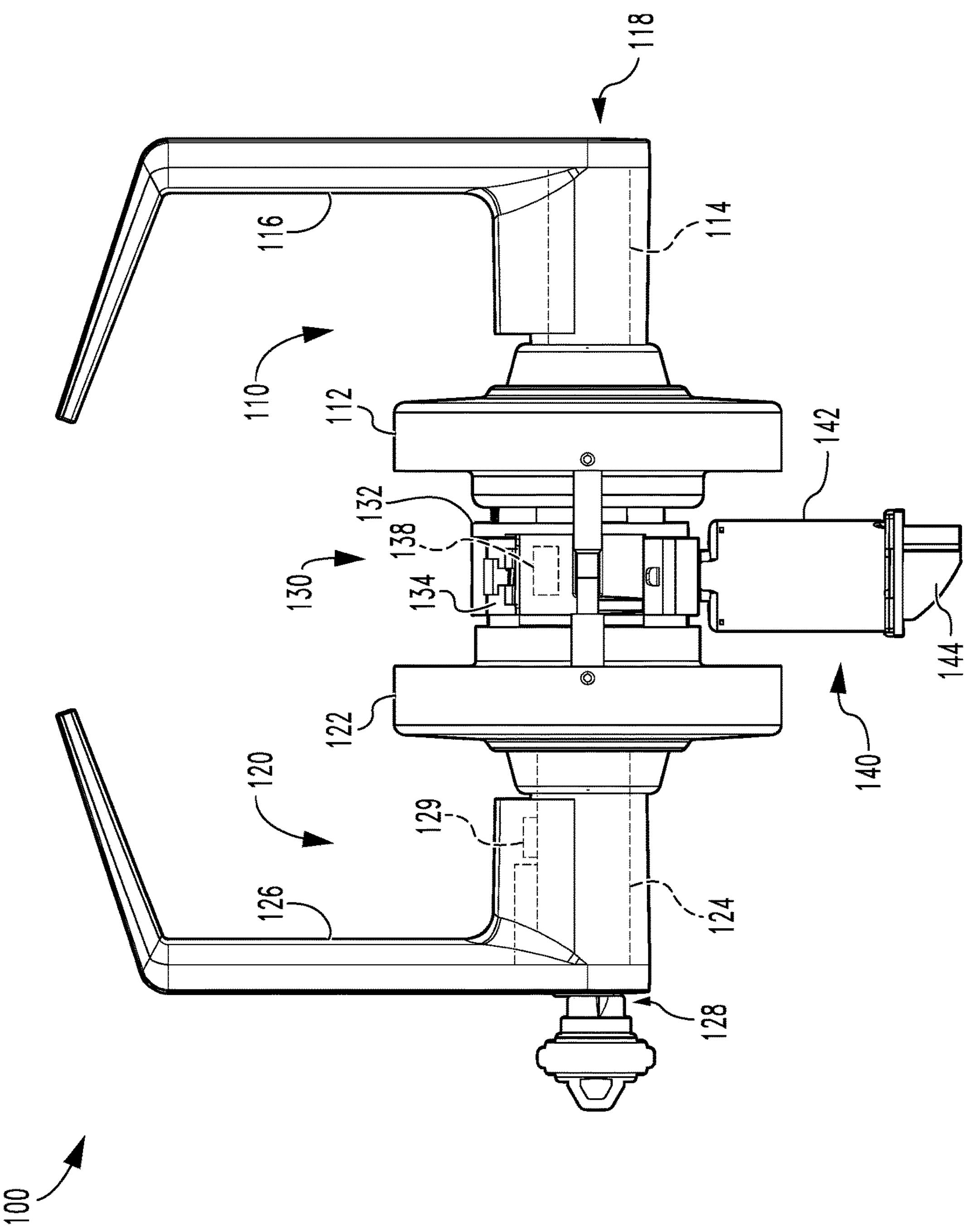
FIG. 1 is a plan view of a lockset according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" may be used to denote motion or spacing along three mutually perpendicular axes, wherein each of the axes defines two opposite directions. Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. Moreover, the term "transverse" may also be used to describe motion or spacing that is non-parallel to a particular axis or direction. For example, an element that is described as being "movable in a direction transverse to the longitudinal axis" may move in a direction that is perpendicular to the longitudinal axis and/or in a direction oblique to the longitudinal axis. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as “a,” “an,” “at least one,” and/or “at least one portion” should not be interpreted so as to be limiting to only one such element unless specifically stated to the contrary, and the use of phrases such as “at least a portion” and/or “a portion” should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a lockset 100 according to certain embodiments. The lockset 100 generally includes an inside handleset 110, an outside handleset 120 opposite the inside handleset 110, a chassis 130 engaged with each of the inside handleset 110 and the outside handleset 120, and a latchbolt mechanism 140 engaged with the chassis 130. As described herein, each of the inside handleset 110 and the outside handleset 120 is at least selectively operable to actuate the latchbolt mechanism 140.

The inside handleset 110 generally includes an inside housing 112, an inside spindle 114 rotatably mounted to the inside housing 112, and an inside handle 116 coupled to the inside spindle 114. In certain embodiments, the inside handleset 110 may further include a lock actuation mechanism 118 operable to transition a lock mechanism 138 of the chassis 130 between a locked state and an unlocked state. In certain embodiments, the lock actuation mechanism 118 may be provided in the form of a manually-actuated lock actuation mechanism, such as a pushbutton, a turnpiece, or a push-turn button. In certain embodiments, the lock actuation mechanism 118 may be provided in the form of a key-operated lock actuation mechanism, such as a lock cylinder. In certain embodiments, the lock actuation mechanism 118 may include electronic features. In certain embodiments, such as those in which the lock actuation mechanism 118 is provided in the form of a lock cylinder, the inside handleset 110 may further include a spacer. In the illustrated form, the inside handle 116 is provided in the form of a lever handle. It is also contemplated that the handle 116 may be provided in another form, such as that of a knob handle. Further details regarding example forms for the inside handleset 110 and the spacer are provided herein with reference to FIGS. 2-4 and 7-10.

The outside handleset 120 generally includes an outside housing 122, an outside spindle 124 rotatably mounted to the outside housing 122, an outside handle 126 coupled to the outside spindle 124, a lock actuator in the form of a lock cylinder 128 seated in the outside spindle 124, and a spacer 129 supporting the lock cylinder 128. The lock cylinder 128 is engaged with a lock mechanism 138 of the chassis 130 such that the lock cylinder 128 is operable to transition the lock mechanism 138 between a locked state, in which the lock mechanism 138 prevents the outside handle 126 from actuating the latchbolt mechanism 140, and an unlocked state, in which the lock mechanism 138 does not prevent the outside handle 126 from actuating the latchbolt mechanism 140. While the lock actuator of the illustrated embodiment is provided in the form of a lock cylinder 128, it is also contemplated that another form of lock actuator may be utilized. For example, a lock actuator in the form of a release mechanism is described herein with reference to FIGS. 14 and 15. In the illustrated form, the outside handle 126 is provided in the form of a lever handle. It is also contemplated that the handle 126 may be provided in another form, such as that of a knob handle. Further details regarding example forms for the outside handleset 120 and the spacer 129 are provided herein with reference to FIGS. 2-4 and 7-10. The chassis 130 generally includes a housing 132, a retractor 134 movably mounted in the housing 132, and a lock mechanism 138 operable to selectively prevent the outside handle 126 from actuating the latchbolt mechanism 140. The retractor 134 is engaged with the inside spindle 114 such that the inside handle 116 is operable to drive the retractor 134 in an actuating movement. The retractor 134 is also engaged with the outside spindle 124 such that the outside handle 126 is at least selectively operable to drive the retractor 134 in the actuating movement. As described herein, the retractor 134 is also engaged with the latchbolt mechanism 140 such that the actuating movement of the retractor 134 actuates the latchbolt mechanism 140.

The latchbolt mechanism 140 generally includes a housing 142 and a latchbolt 144 mounted in the housing 142 for movement between an extended position and a retracted position. The latchbolt 144 is engaged with the retractor 134 such that the actuating movement of the retractor 134 retracts the latchbolt 144.

Figure 2:
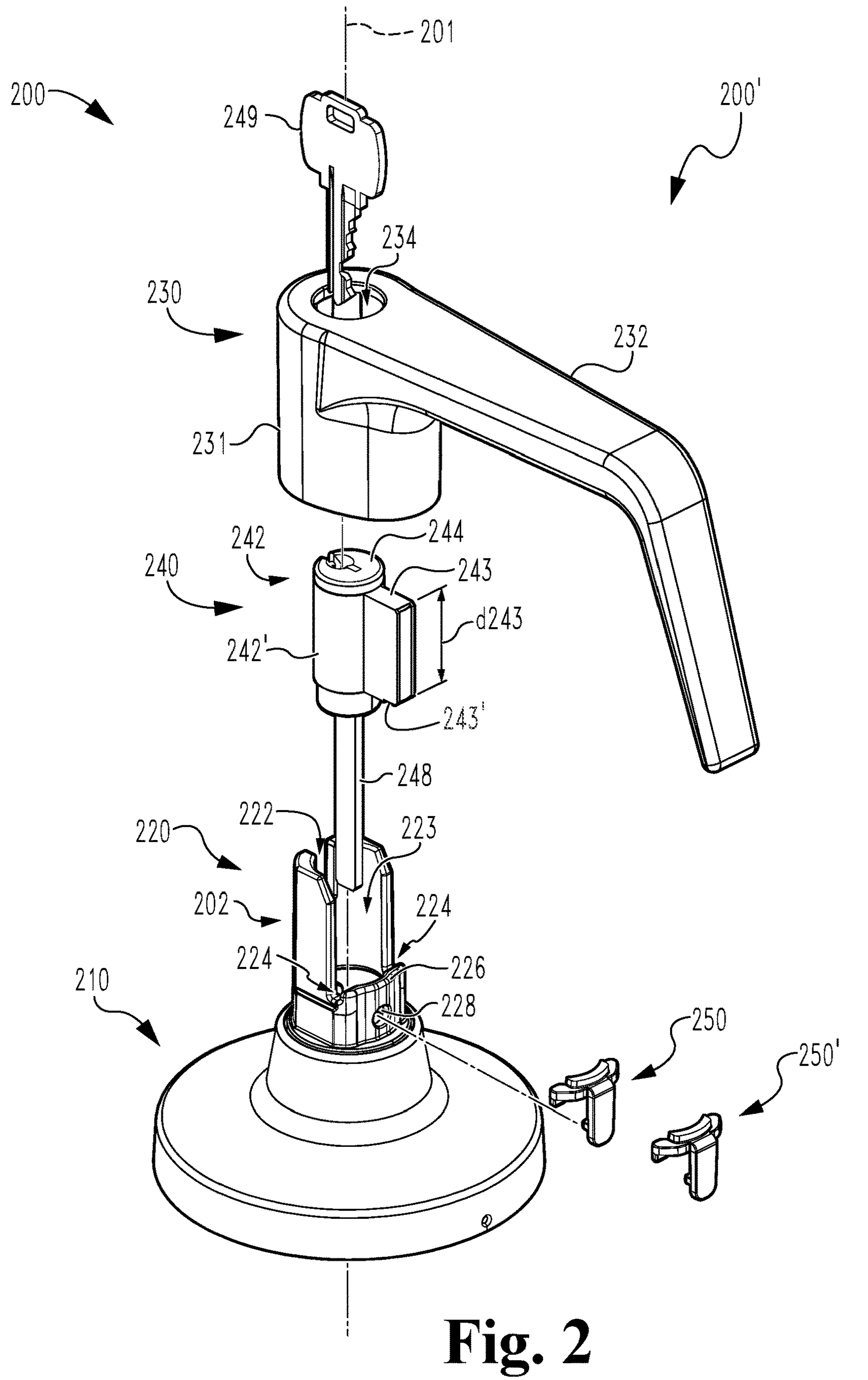
FIG. 2 is an exploded assembly view of a handleset according to certain embodiments.
Figure 3:
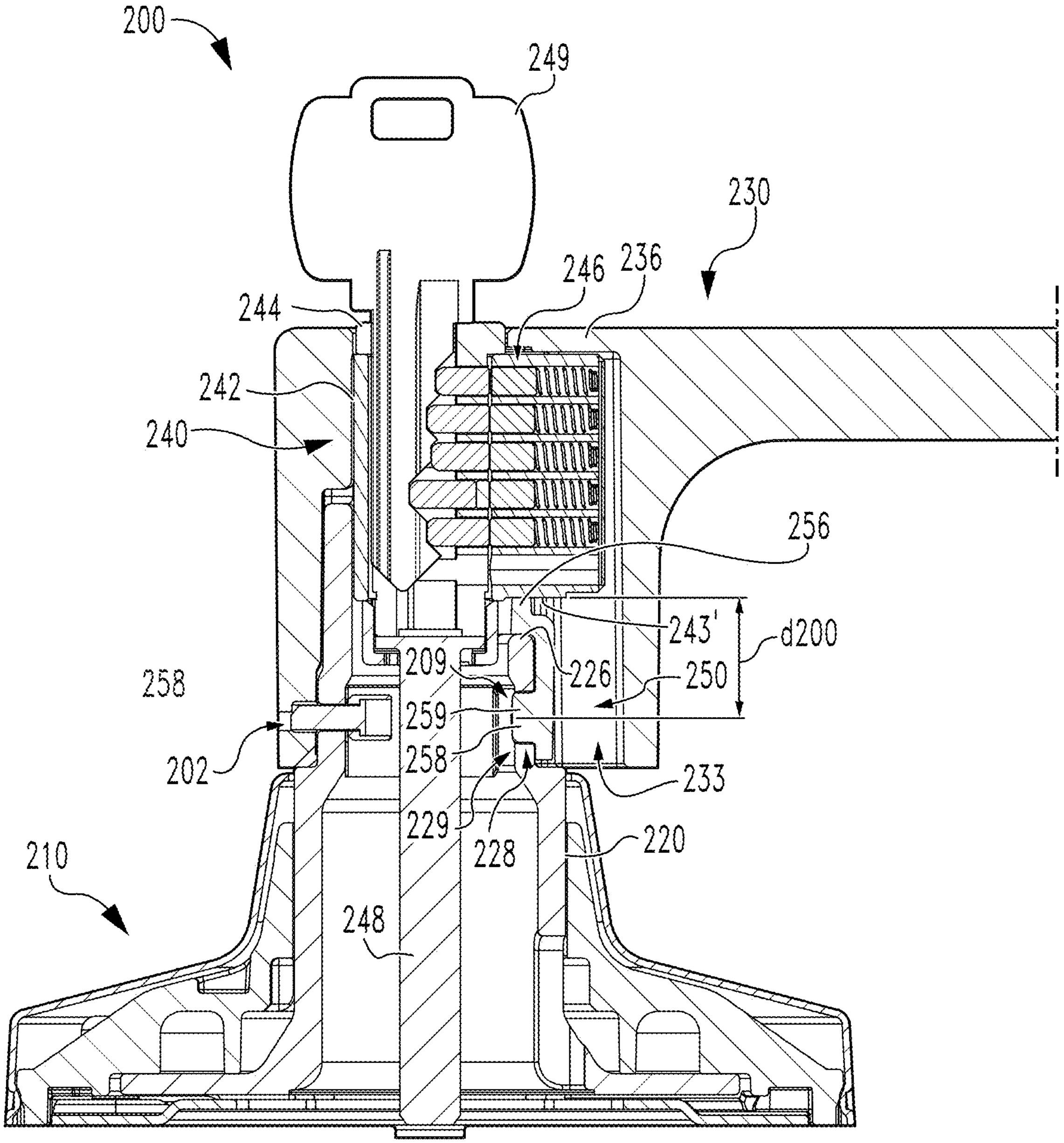
FIG. 3 is a cross-sectional view of the handleset illustrated in FIG. 2.

With additional reference to FIGS. 2 and 3, illustrated therein is a handleset 200 according to certain embodiments. The handleset 200 may, for example, be utilized in the above-described lockset 100 as the inside handleset 110 and/or the outside handleset 120. The handleset 200 generally includes a housing 210, a spindle 220 rotatably mounted to the housing 210, a handle 230 releasably coupled to the spindle 220, a lock actuator such as a lock cylinder 240 mounted in the spindle 220, and a modular spacer 250 supporting the lock cylinder 240. The handleset 200 may further include a coupler 202 (e.g., a set screw or catch mechanism) configured to selectively prevent removal of the handle 230 from the spindle 220.

The housing 210 is configured for mounting to a door, and provides a base to which the spindle 220 is rotatably mounted. In certain embodiments, the housing 210 may include or be covered by a decorative rose.

The spindle 220 is mounted to the housing 210 for rotation about the central longitudinal axis 201 of the handleset 200, and includes an internal chamber 222 and a slot 223 extending distally (downward in FIGS. 2 and 3) from a proximal end of the spindle 220. Formed adjacent the slot 223 are a pair of recesses 224, which extend distally beyond a shelf 226 that defines a distal end of the slot 223. The spindle 220 also includes an attachment feature 228 operable to mate with a corresponding attachment feature 258 of the spacer 250. In the illustrated form, the attachment feature 228 is provided in the form of an aperture 229 having a generally circular geometry. It is also contemplated that the attachment feature 228 may have another geometry and/or may be provided as a male protrusion that mates with a female configuration of the attachment feature 258.

The handle 230 is mounted to the spindle 220, and includes a shank 231 and a grip portion 232 extending from the shank 231. Formed within the shank 231 is an internal chamber 234 that receives the spindle 220. Extending alongside the chamber 234 is a channel 233, which extends proximally from a distal end of the shank 231, and terminates in a wall 236 at a proximal end of the handle 230. In the illustrated form, the handle 230 is provided in the form of a lever handle. It is also contemplated that the handle 230 may be provided in another form, such as that of a knob handle.

The lock cylinder 240 generally includes a shell 242, a plug 244 rotatably mounted in the shell 242, a tumbler assembly 246 operable to selectively prevent rotation of the plug 244 relative to the shell 242, and a tailpiece 248 operable to be rotated by the plug 244. The tailpiece 248 is operable to engage a lock mechanism (e.g., the lock mechanism 138 of the chassis 130) such that rotation of the plug 244 is transmitted by the tailpiece 248 to the lock mechanism to thereby actuate the lock mechanism. The shell 242 includes a body 242' seated in the spindle chamber 222 and a tower 243 that extends through the slot 223 and into the channel 233. The shell 242 has a distal support surface 243', which may be defined at least in part by the tower 243. As described herein, the support surface 243' engages the spacer 250 such that the spacer 250 prevents distal movement of the lock cylinder 240. Upon insertion of the appropriate key 249, the tumbler assembly 246 permits rotation of the plug 244 relative to the shell 242. In the illustrated form, the tumbler assembly 246 is provided in the form of a pin tumbler assembly. It is also contemplated that the tumbler assembly 246 may be provided in another form, such as one including disk tumblers, wafer tumblers, finger pins, and/or other forms of tumblers. In certain forms, the lock cylinder 240 may be replaced with another form of lock actuator, such as the release mechanism illustrated in FIGS. 14 and 15.

In the illustrated form, the lock cylinder 240 is provided in the key-in-lever (KIL) format. It should be noted that the lock cylinder 240 may be provided in any of a number of configurations within the KIL format, and that one or more dimensions of the lock cylinder 240 may vary from one configuration to the next. For example, the tower length d243 of one configuration may be different from the tower length d243 of another configuration. In conventional systems, such differing tower lengths would often require that a unique spindle be utilized for each lock cylinder configuration. As described herein, however, the spacer 250 may obviate the need for plural spindle configurations, thereby facilitating the use of a single spindle 220 with multiple lock cylinder configurations. Moreover, while the lock cylinder 240 of the illustrated embodiments is provided in the KIL format, it is also contemplated that handlesets according to certain embodiments may include a lock cylinder of another format, such as an interchangeable core (IC) format. Further details regarding an example handleset including an interchangeable core lock cylinder are provided below with reference to FIGS. 7-10.

Also illustrated in FIG. 2 is a kit 200' including at least a portion of the handleset 200 and an additional spacer 250' operable to replace the spacer 250. As described herein, the additional spacer 250' differs in at least one aspect from the spacer 250. In certain embodiments, the kit 200' may include the housing 210, the spindle 220, the handle 230, the spacer 250, and the additional spacer 250'. In such forms, a user may provide a lock cylinder operable to serve as the lock cylinder 240, and select the appropriate spacer 250, 250' based on the configuration of the lock cylinder as described herein.

Figure 4:
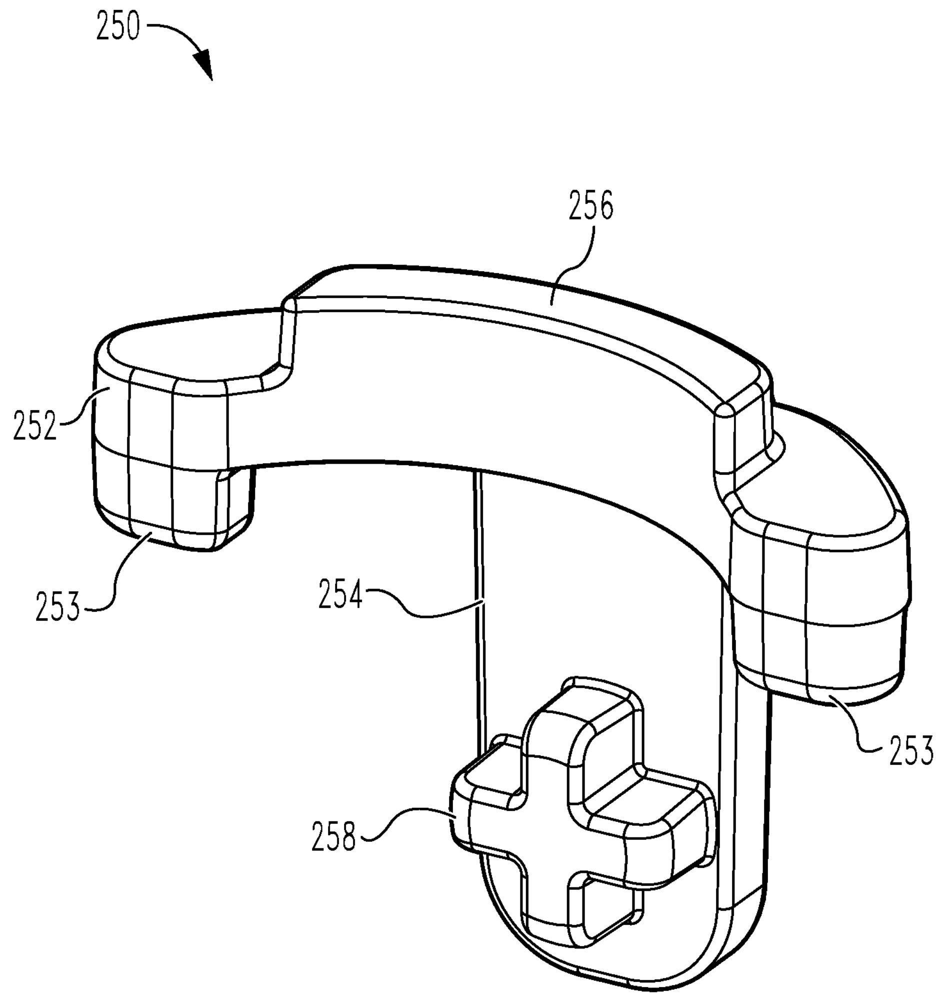
FIG. 4 is a perspective view of a spacer according to certain embodiments.

With additional reference to FIG. 4, the spacer 250 generally includes a body 252, an arm 254 extending distally from the body 252, a ledge 256 positioned opposite the arm 254, and an attachment feature 258 formed on the arm 254. The body 252 is configured to be seated on the spindle shelf 226, and may include a pair of lugs 253 sized and shaped to enter the recesses 224 to thereby restrict rotation of the spacer 250 relative to the spindle 220. The ledge 256 is positioned on a proximal side of the body 252, and is configured to engage the distal support surface 243' of the lock cylinder 240. In the illustrated form, the ledge 256 is raised relative to the body 252. It is also contemplated that the ledge 256 may be flush with the proximal side of the body 252 or recessed relative to the proximal side of the body 252.

The attachment feature 258 is configured to mate with the attachment feature 228 of the spindle 220, and in the illustrated form is provided as a protrusion 259 with a cross-section having the geometry of a plus sign. It is also contemplated that the attachment feature 258 may be provided in the form of a female attachment feature (e.g., a recess or aperture), for example in embodiments in which the attachment feature 228 of the spindle 220 has a male geometry. The attachment feature 258 may be provided in a compliant material, such as a plastic material and/or an elastomeric material. Such a compliant material may aid the generation of a frictional interference fit 209 with the attachment feature 228 of the spindle 220. In the illustrated form, the frictional interference fit 209 is formed between the protrusion 259 of the spacer 250 and the aperture 229 of the spindle 220. In certain embodiments, the spacer 250 may be provided as a unitary, integrally formed component that may, for example, be formed of a compliant material. It is also contemplated that the spacer 250 may be formed of plural components and/or diverse materials. Moreover, while the illustrated attachment features 228, 258 are configured to provide a frictional interference fit, it is also contemplated that other forms of engagement may be utilized, such as snap fits and/or threaded engagement features.

Figure 5:
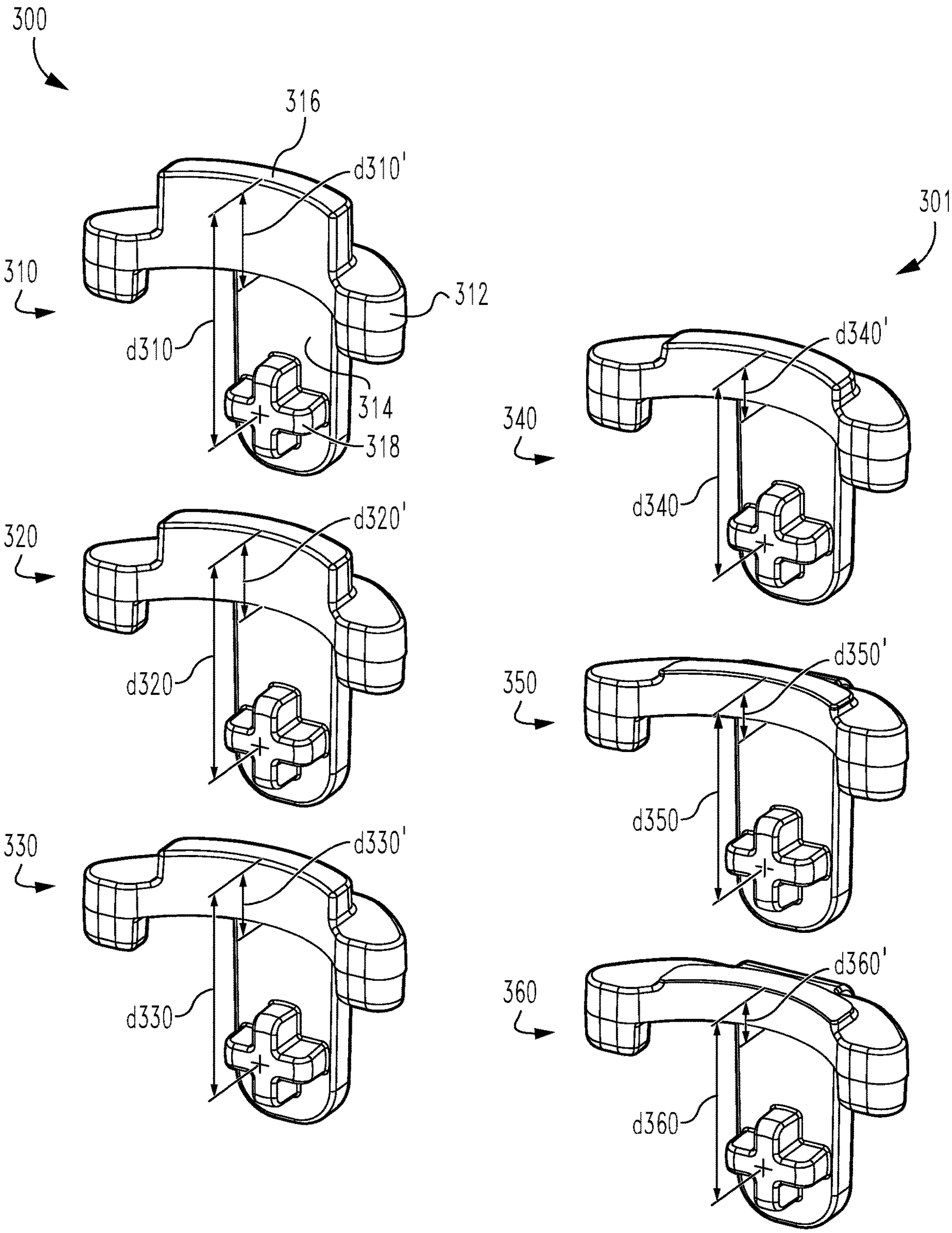
FIG. 5 illustrates a spacer kit according to certain embodiments.

With additional reference to FIG. 5, illustrated therein is a spacer kit 300 according to certain embodiments. The spacer kit 300 includes a plurality of spacers 301, including a first spacer 310, a second spacer 320, a third spacer 330, a fourth spacer 340, a fifth spacer 350, and a sixth spacer 360. In certain embodiments, the spacer kit 300 may be provided with a handleset (e.g., the handleset 200) or a lockset (e.g., the lockset 100). As described herein, each of the spacers 301 in the spacer kit 300 is configured for use with at least one corresponding configuration of a lock cylinder, and is operable to be used as the spacer 250 in the handleset 200. While the illustrated spacer kit 300 includes six spacers, it is also contemplated that more or fewer spacers may be provided in a spacer kit.

Each of the spacers 301 is substantially similar to the above-described spacer 250, and similar reference characters are used to denote similar elements and features. For example, the first spacer 310 includes a body 312, an arm 314 extending from the body 312, a ledge 316 opposite the arm 314, and an attachment feature 318 formed on the arm 314. In the first spacer 310, the ledge 316 is offset from the attachment feature 318 by a first offset distance d310. Each of the remaining spacers also has a corresponding and respective offset distance defined between its ledge and its attachment feature. More particularly, the second spacer 320 has a second offset distance d320, the third spacer 330 has a third offset distance d330, the fourth spacer 340 has a fourth offset distance d340, the fifth spacer 350 has a fifth offset distance d350, and the sixth spacer 360 has a sixth offset distance d360.

In certain embodiments, an offset distance may be measured between the attachment feature and the proximal or upper surface of the ledge. For example, the offset distance d310 is defined as the distance between the attachment feature 318 and the proximal surface of the ledge 316. It is also contemplated that an offset distance may be measured between the distal surface of the base (which may contact the shelf 226) and the proximal surface of the ledge (which may contact the distal support surface 243'). For example, an offset distance d310' for the first spacer 310 may be defined between the distal surface of the base 312 and the proximal surface of the ledge 316. Also illustrated in FIG. 5 are offset distances d320', d330', d340', d350', d360' for the remaining spacers 320, 330, 340, 350, 360.

Each spacer corresponds to a respective configuration of lock cylinder, and is configured to secure lock cylinders of the corresponding configuration within the handleset 200. More particularly, each spacer 301 in the spacer kit 300 is configured to be mounted to the spindle 220 and to capture the tower 243 of the corresponding lock cylinder configuration between the ledge thereof and the proximal wall 236 of the channel 233. Those skilled in the art will readily recognize that in embodiments in which the distance between the proximal wall 236 and the attachment feature 228 of the spindle 220 and/or the distance between the proximal wall 236 and the shelf 226 is/are fixed, the offset distance appropriate for a spacer to be used with a particular configuration of lock cylinder 240 varies as a function of the tower length d243. More particularly, a lock cylinder configuration with a shorter tower length d243 will generally indicate the use of a spacer with a greater offset distance, and a lock cylinder configuration with a longer tower length d243 will generally indicate the use of a spacer with a lesser offset distance. In certain embodiments, one or more of the spacers may include indicia that aid in relating each spacer to the corresponding lock cylinder. For example, if the fourth spacer 340 has an offset distance appropriate for use with KIL lock cylinders manufactured by a particular party, the fourth spacer 340 may include indicia relating to that particular party.

In certain embodiments, the offset distances for the spacers in the kit 300 may vary according to a step value. For example, the first offset distance d310 may be greater than the second offset distance d320 by a particular step value, and the second offset distance d320 may be greater than the third offset distance d330 by the same particular step value. This trend may continue such that the offset distance for each of the spacers is a base value plus (or minus) an integer multiple of the step value. In certain embodiments, the step value may be between one millimeter and three millimeters, such as about two millimeters (e.g., two millimeters+/−one half millimeter). It is also contemplated that the offset distances for the spacers in the kit 300 may not necessarily vary according to a predetermined step value, and may instead vary according to another parameter. For example, the difference between the fourth offset distance d340 and the third offset distance d330 may be different from the difference between the fourth offset distance d340 and the fifth offset distance d350.

Figure 6:
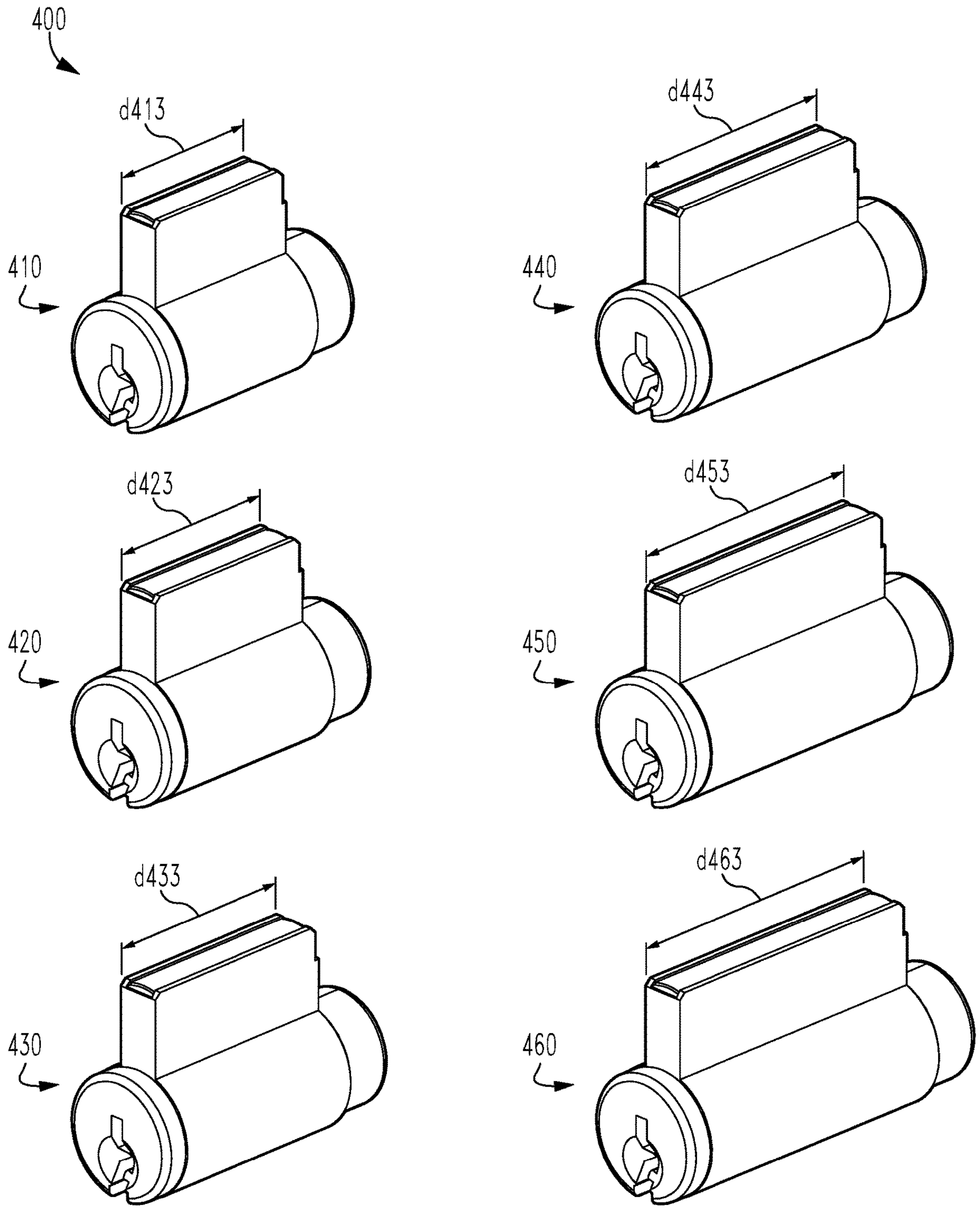
FIG. 6 illustrates a group of lock cylinders according to certain embodiments.

With additional reference to FIG. 6, illustrated therein is a group of lock cylinders 400 from which a lock cylinder may be selected for use as the lock cylinder 240, including first through sixth lock cylinders 410, 420, 430, 440, 450, 460. In the illustrated form, all lock cylinders in the group 400 are of the KIL format, and each has a corresponding and respective tower length. For example, the first lock cylinder 410 has a first tower length d413, and the second lock cylinder 420 has a second tower length d423 different from the first tower length d413. Each of third through sixth lock cylinders 430, 440, 450, 460 also has a corresponding and respective tower length d433, d443, d453, d463. It should be appreciated that one or more other characteristics of the lock cylinders (e.g., manufacturer, type of tumbler assembly, security level, and/or one or more other characteristics) may vary from one configuration to the next.

Each of the illustrated lock cylinder configurations in the lock cylinder group 400 corresponds to a respective one of the spacer configurations in the spacer kit 300. For example, the first lock cylinder 410 has the shortest tower length d413, and is configured for use with the first spacer 310, which has the greatest offset distance d310. Conversely, the sixth lock cylinder 460 has the greatest tower length d463, and is configured for use with the sixth spacer 360, which has the shortest offset distance d360. The remaining lock cylinder configurations 420, 430, 440, 450 have varying tower lengths, and each is configured for use with a corresponding one of the remaining spacers 320, 330, 340, 350.

Figure 7:
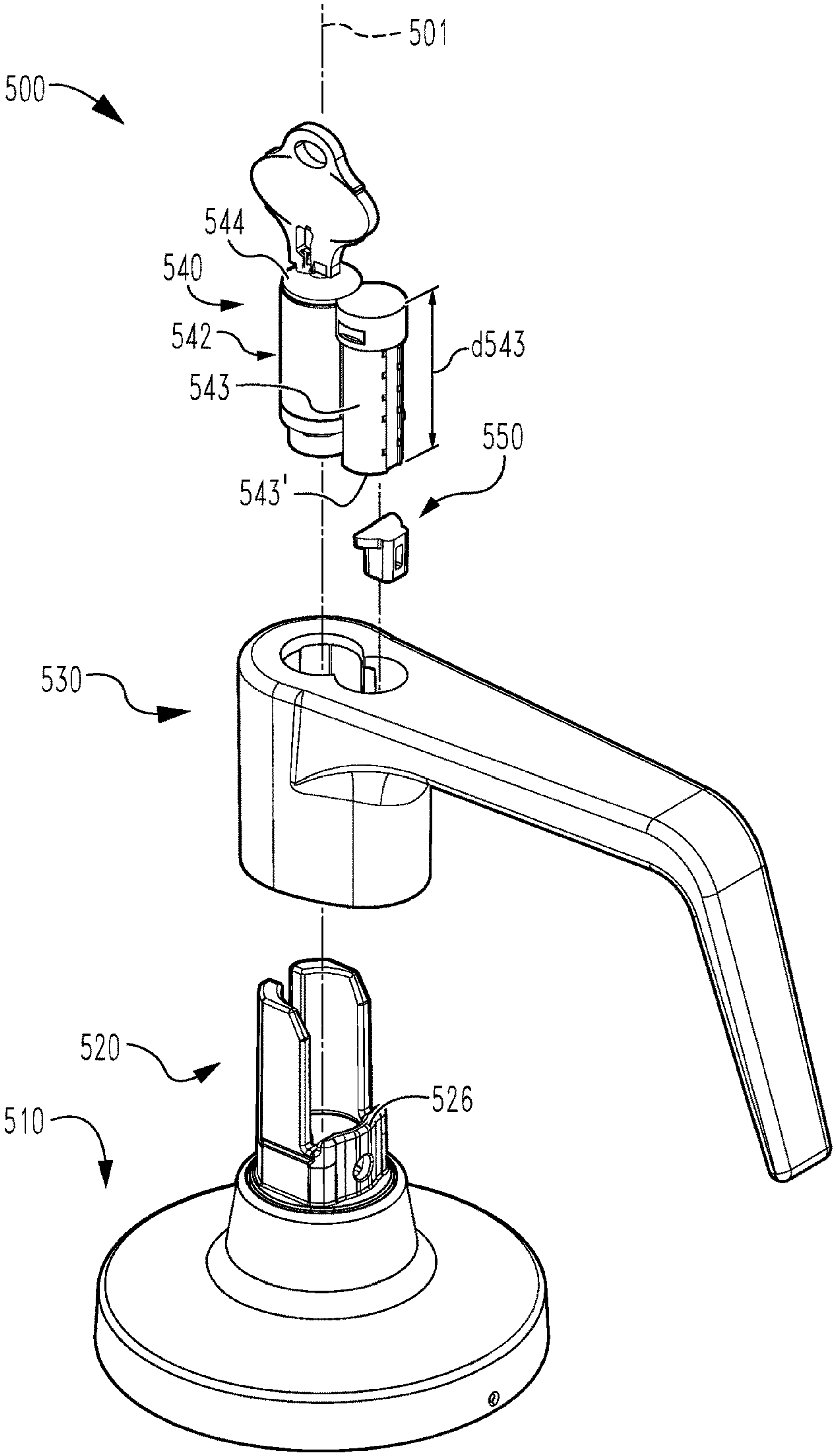
FIG. 7 is an exploded assembly view of a handleset according to certain embodiments.
Figure 8:
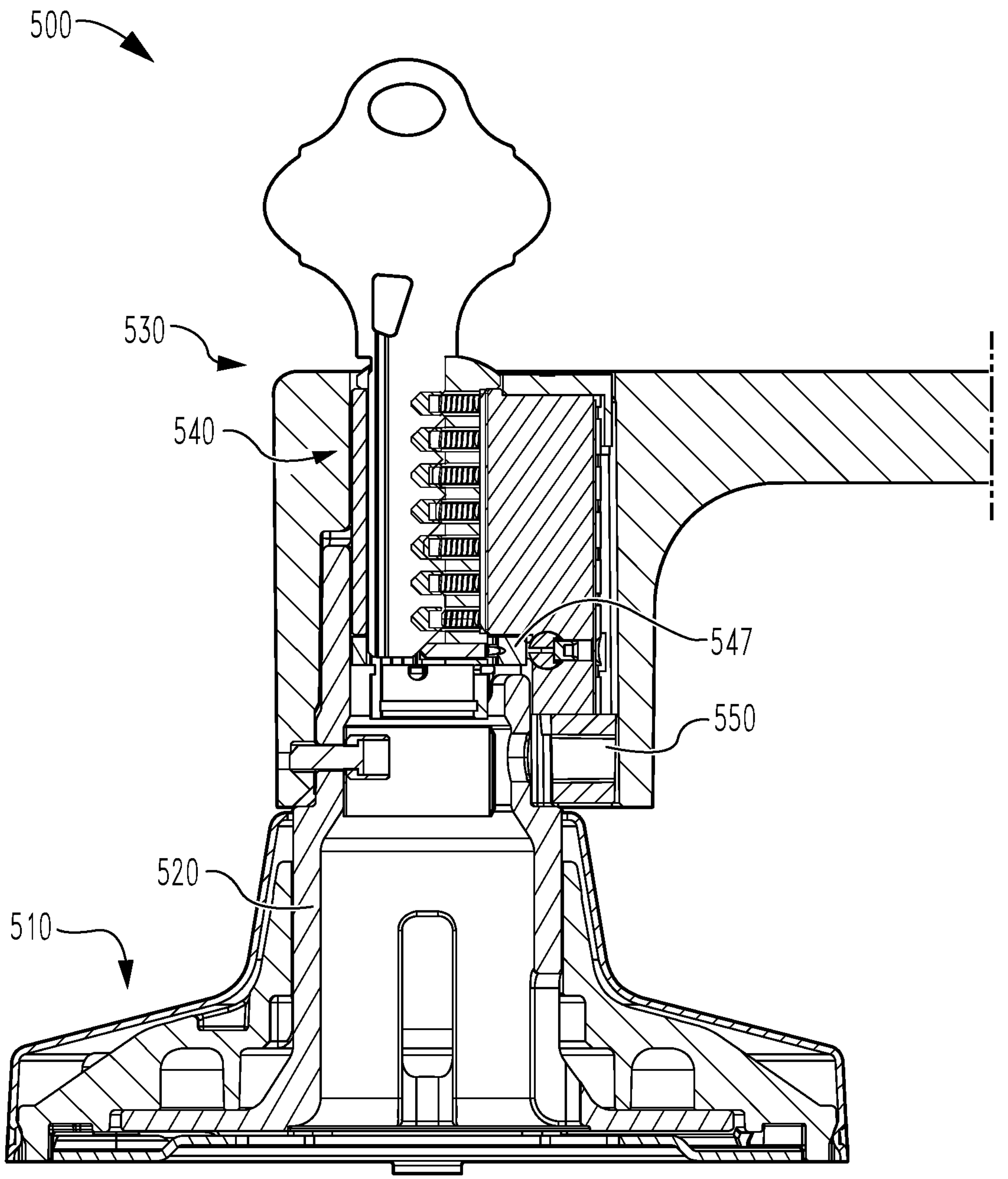
FIG. 8 is a cross-sectional view of the handleset illustrated in FIG. 7.

With additional reference to FIGS. 7 and 8, illustrated therein is a handleset 500 according to certain embodiments. The handleset 500 may, for example, be utilized in the above-described lockset 100 as the inside handleset 110 and/or the outside handleset 120. The handleset 500 is somewhat similar to the above-described handleset 200, and generally includes a housing 510, a spindle 520, a handle 530, a lock cylinder 540, and a modular spacer 550, which respectively correspond to the above-described housing 210, spindle 220, handle 230, lock cylinder 240, and modular spacer 250. In certain embodiments, the housing 510 and the spindle 520 may be the same housing 210 and spindle 220 utilized in the handleset 200, such that the handleset 200 can be converted to the handleset 500 by replacing the handle 230, the lock cylinder 240, and the spacer 250 with the handle 530, the lock cylinder 540, and the spacer 550, respectively. In the interest of conciseness, the following description of the handleset 500 focuses primarily on elements and features different from those described above in connection with the handleset 200.

While the handleset 200 is a KIL format handleset, the handleset 500 is an IC format handleset. Thus, the KIL format handle 230 is replaced with an IC format handle 530, the KIL format lock cylinder 240 is replaced with an IC format lock cylinder 540, and the KIL format spacer 250 is replaced with an IC format spacer 550. It is also contemplated that an IC format lock cylinder may be utilized in connection with the above-described KIL format spacer 250. Those skilled in the art will readily recognize that in contrast to the KIL format handleset 200, in which the lock cylinder 240 is loaded from the rear or distal side of the handle 230, the lock cylinder 540 of the IC format handleset 500 is loaded from the front or proximal side of the handle 530. The lock cylinder 540 is then retained in the handle 530 by a control lug 547, which can be moved between a retaining position and a releasing position by an appropriate control key. As described herein, the spacer 550 is engaged with the handle 530 and supports the lock cylinder 540 to reduce or eliminate rattle, wobble, and/or other movement of the lock cylinder 540. In addition or as an alternative to reducing movement of the lock cylinder 540, the spacer 550 may aid in installation of the lock cylinder 540.

Figure 9:
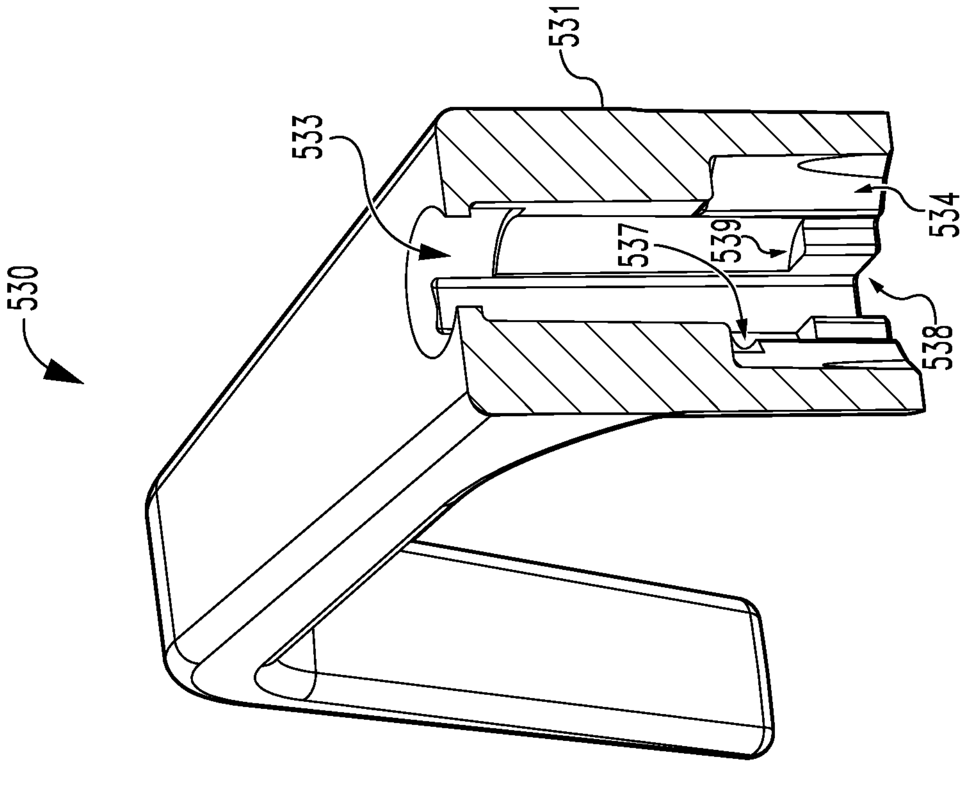
FIG. 9 is a cutaway view of a handle of the handleset illustrated in FIG. 7.

With additional reference to FIG. 9, the IC format handle 530 includes a chamber 534, a channel 533 that receives the tower 543 of the lock cylinder shell 542, and a recess 537 that receives a portion of the control lug 547. Formed in a distal portion of the shank 531 are a shelf 539 and an attachment feature 538 in the form of a channel that extends distally from the proximal-facing shelf 539. As described herein, the attachment feature 538 is sized and shaped to engage a corresponding attachment feature 558 of the spacer 550 to thereby retain the position of the spacer 550 within the handle 530.

Figure 10:
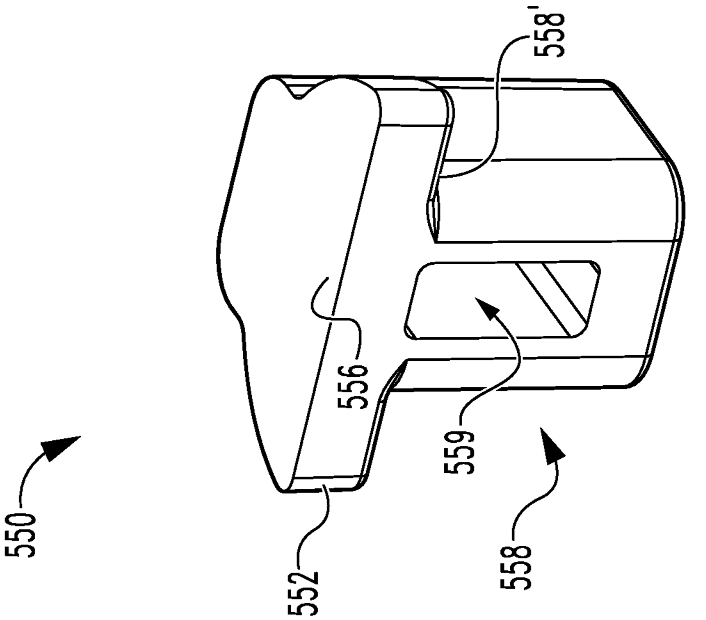
FIG. 10 is a perspective view of a spacer according to certain embodiments.

With additional reference to FIG. 10, the IC format spacer 550 generally includes a body 552, a ledge 556 formed on a first side of the body 552, and an attachment feature 558 formed on an opposite second side of the body 552. In the illustrated form, the ledge 556 is flush with the proximal face of the body 552. It is also contemplated that the ledge 556 may be formed on a projection extending from the body 552 or a recess formed within the body 552. The illustrated attachment feature 558 is provided in the form of a male component configured to mate with the female attachment feature 538 of the handle 530, and may, for example, be formed of a compliant material such as plastic and/or rubber to facilitate the formation of an interference press-fit connection with the handle attachment feature 538. In certain embodiments, the attachment feature 558 may include a cavity 559 to allow the walls of the attachment feature 558 to slightly flex inward, thereby facilitating the formation of an interference press-fit connection with the handle attachment feature 538.

Figure 11:
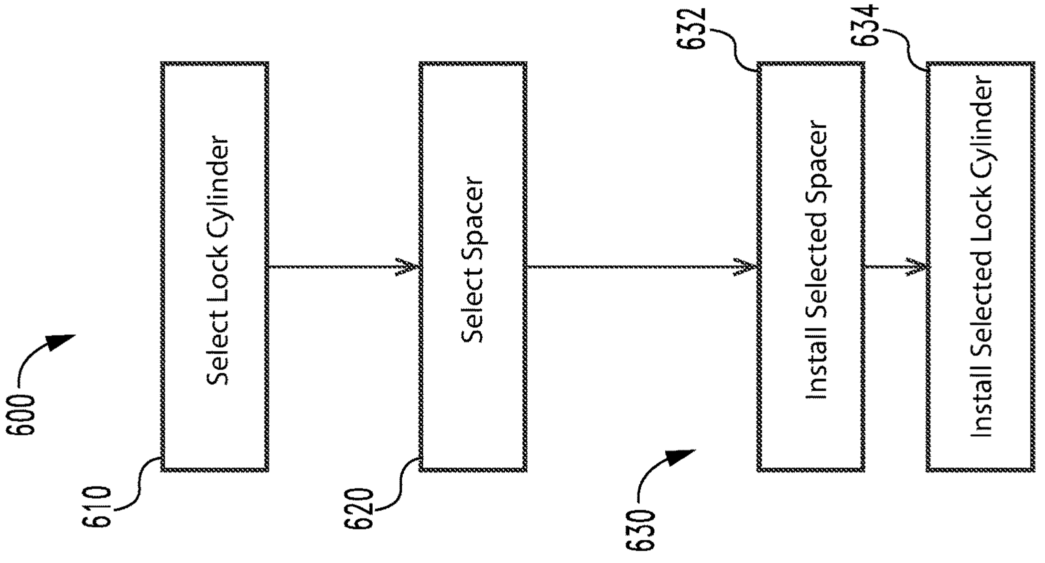
FIG. 11 is a schematic flow diagram of a process according to certain embodiments.

With the handleset 500 assembled, the distal support surface 543' of the lock cylinder 540 engages the ledge 556 of the spacer 550, thereby restricting movement of the lock cylinder 540 relative to the handle 530. In certain forms, a single cylinder spacer 550 may be sufficient to support plural configurations of IC format lock cylinders 540. It is also contemplated that the spacer 550 may be provided in a spacer kit similar to the spacer kit 300, with the ledges of the various spacers having different offset distances from the attachment features of the spacers. For example, should two IC format lock cylinders have significantly different tower lengths d543, a first spacer may be provided to support an IC format lock cylinder of a first configuration, and a second spacer may be provided to support an IC format lock cylinder of a second configuration. With additional reference to FIG. 11, illustrated therein is an exemplary process 600 that may be performed to produce a handleset such as the handleset 200 and/or the handleset 500. Blocks illustrated for the processes in the present application are understood to be examples only, and blocks may be combined or divided, and added or removed, as well as re-ordered in whole or in part, unless explicitly stated to the contrary. While the blocks are illustrated in a relatively serial fashion, it is to be understood that two or more of the blocks may be performed concurrently or in parallel with one another. Moreover, while the process 600 is described herein with specific reference to the handleset 200 illustrated in FIGS. 2-4, it is to be appreciated that the process 600 may be performed to manufacture access control devices having additional and/or alternative features, including but not limited to the handleset 500.

The process 600 may include block 610, which generally involves selecting, from a plurality of lock cylinders each having a different configuration, a selected lock cylinder for installation to an access control device. For example, block 610 may involve selecting, from the lock cylinder group 400, a selected lock cylinder, such as the third lock cylinder 430. The selecting of block 610 may, for example, be based upon one or more of the characteristics of the lock cylinders, such as manufacturer, security level, tumbler assembly type, and/or other characteristics.

The process 600 may include block 620, which generally involves selecting, from a plurality of spacers, a selected spacer. For example, block 620 may involve selecting the spacer from the spacer kit 300. In certain embodiments, the selecting of block 620 may be based upon the configuration of the lock cylinder selected in block 610. As one example, block 620 may involve selecting the spacer based upon the tower length of the selected lock cylinder. In certain embodiments, the selection may be based at least in part upon indicia provided to the spacers. For example, if the selected lock cylinder 430 is manufactured by a particular party known to have a particular tower length, one of the spacers may have an offset distance corresponding to the particular tower length, and/or may include indicia indicating that the spacer is intended for use with a lock cylinder manufactured by that particular party.

The process 600 may include flow 630, which generally involves assembling the handleset using the selected spacer and the selected lock cylinder. For example, flow 630 may involve assembling the handleset 200 using the selected spacer 330 as the spacer 250 and the selected lock cylinder 430 as the lock cylinder 240. In certain embodiments, flow 630 may include block 632, which generally involves installing the selected spacer to an access control device. For example, block 632 may involve installing the selected spacer 330 to the handleset 200 by engaging the attachment features 228, 258 with one another. In certain embodiments, flow 630 may include block 634, which generally involves installing the selected lock cylinder to the access control device. For example, block 634 may involve inserting the selected lock cylinder 430 into the handle 230 as the lock cylinder 240, and mounting the handle 230 and lock cylinder 240/430 to the spindle 220. With the selected spacer and the selected lock cylinder installed to the access control device, the selected spacer supports and/or otherwise restricts movement the selected lock cylinder. For example, the tower of the selected lock cylinder 430 may be captured between the proximal wall 236 of the handle 230 and the ledge of the selected spacer 330, thereby limiting longitudinal movement of the lock cylinder 240.

Figure 12:
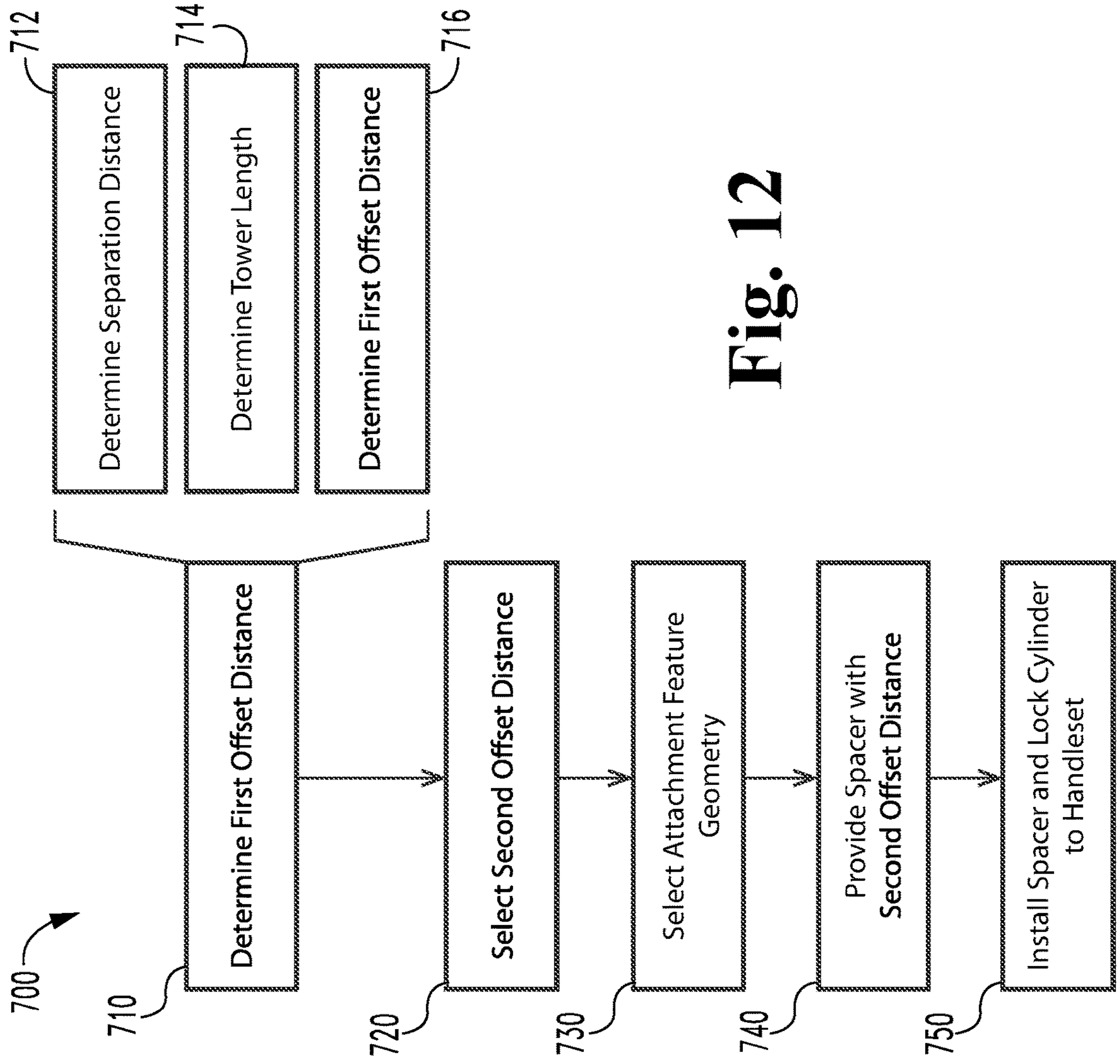
FIG. 12 is a schematic flow diagram of a process according to certain embodiments.

With additional reference to FIG. 12, illustrated therein is an exemplary process 700 that may be performed to produce a spacer such as the spacer 250 and/or the spacer 550. Blocks illustrated for the processes in the present application are understood to be examples only, and blocks may be combined or divided, and added or removed, as well as re-ordered in whole or in part, unless explicitly stated to the contrary. While the blocks are illustrated in a relatively serial fashion, it is to be understood that two or more of the blocks may be performed concurrently or in parallel with one another. Moreover, while the process 700 is described herein with specific reference to the handleset 200 illustrated in FIGS. 2-4, it is to be appreciated that the process 700 may be performed to manufacture spacers for access control devices having additional and/or alternative features, including but not limited to the handleset 500.

The process 700 may include block 710, which generally involves determining a first offset distance. The determining of block 710 may be based upon a particular handleset configuration having a first attachment feature and a particular lock cylinder configuration having a support surface. The first offset distance determined in block 710 may, for example, be defined as the desired distance between the first attachment feature and the support surface when a lock cylinder of the particular lock cylinder configuration is installed to a handleset of the particular handleset configuration. For example, block 710 may involve determining the first offset distance as the distance d200 that is desired to be provided between the attachment feature 228 of the spindle 220 and the support surface 243' of the lock cylinder 240. Additionally or alternatively, block 710 may involve determining the first offset distance as the distance that is desired to be provided between the shelf 226 and the support surface 243'.

In certain embodiments, block 710 may include block 712, which generally involves determining a separation distance. For example, in embodiments in which the access control device is the handleset 200, block 712 may involve determining the separation distance between the attachment feature 228 of the spindle 220 and the proximal wall 236 of the channel 233 when the handle 230 is mounted to the spindle 220. Additionally or alternatively, block 712 may involve determining the separation distance between the shelf 226 and the proximal wall 236 when the handle 230 is mounted to the spindle 220. In embodiments in which the access control device is the handleset 500, block 712 may involve determining the separation distance between the front face of the handle 530 and the attachment feature 538 when the handle 530 is mounted to the spindle 550. Additionally or alternatively, block 712 may involve determining the separation distance between the front face of the handle 530 and the shelf 526 when the handle 530 is mounted to the spindle 520.

In certain embodiments, block 710 may include block 714, which generally involves determining a tower length for the selected lock cylinder configuration. For example, in embodiments in which the particular lock cylinder configuration corresponds to the fifth lock cylinder 450, block 714 may involve determining the tower length d453.

In certain embodiments, block 710 may include block 716, which generally involves determining the first offset distance based upon the separation distance and the tower length. For example, block 716 may involve selecting the first offset distance as the difference between the separation distance and the tower length. It is also contemplated that the first offset distance may be selected based upon a direct measurement of the desired distance between the support surface and the attachment feature.

Once the first offset distance has been determined, the process 700 may proceed to block 720, which generally involves selecting a second offset distance based on the first offset distance. In certain embodiments, block 720 may involve selecting the second offset distance to be equal to the first offset distance (e.g., to provide a snug fit). In certain embodiments, block 720 may involve selecting the second offset distance to be greater than the first offset distance (e.g., to provide an interference fit). In certain embodiments, block 720 may involve selecting the second offset distance to be less than the first offset distance (e.g., to provide a loose clearance fit). In certain embodiments, block 720 may involve selecting the second offset distance to be within 5 mm of the first offset distance, within 2 mm of the first offset distance, or within 1 mm of the first offset distance. Further details regarding these options are provided below.

In certain embodiments, the process 700 may include block 730, which generally involves selecting a geometry for a second attachment feature. The selecting of block 730 may be based upon the geometry of the first attachment feature. For example, in embodiments in which the first attachment feature has a female geometry, the geometry selected in block 730 may be a corresponding male geometry sized and shaped to mate with the female geometry of the first attachment feature. Conversely, in embodiments in which the first attachment feature has a male geometry, the geometry selected in block 730 may be a corresponding female geometry sized and shaped to mate with the male geometry of the first attachment feature.

The process 700 may include block 740, which generally involves providing a spacer having a second attachment feature and a ledge offset from the second attachment feature by the second offset distance. As one example, block 740 may involve providing a KIL format spacer 250. A KIL format spacer 250 may have a second attachment feature 258 and a ledge 256 offset from the second attachment feature 258 by the second offset distance. As another example, block 740 may involve providing an IC format spacer 550. An IC format spacer 550 may have a second attachment feature 558 and a ledge 556 offset from a distal side 558' of the ledge 556 by the second offset distance, for example in embodiments in which the first offset distance is measured as the distance between the shelf and the support surface for the lock actuator. In certain embodiments, such as those in which the process 700 includes block 730, block 740 may involve providing the second attachment feature with the geometry selected in block 730. The providing of block 740 may, for example, involve manufacturing, sourcing, or otherwise procuring the spacer. In certain embodiments, block 740 may involve providing the spacer to a consumer in a kit that also includes a lock cylinder of the particular lock cylinder configuration.

In certain embodiments, the process 700 may include block 750, which generally involves installing the spacer provided in block 740 and a lock cylinder of the particular lock cylinder configuration to a handleset of the particular handleset configuration. With the spacer and lock cylinder installed to the handleset, the spacer engages the support surface of the lock cylinder. For example, in embodiments in which the handleset is provided in the form of the KIL format handleset 200, the ledge 256 of the spacer 250 engages the support surface 243' of the lock cylinder 240. As another example, in embodiments in which the handleset is provided in the form of the IC format handleset 500, the ledge 556 of the spacer 550 engages the support surface 543' of the lock cylinder 540.

As should be evident from the foregoing, a spacer manufactured according to the process 700 may occupy the space between a shelf and a support surface to thereby limit movement of the lock cylinder. Those skilled in the art will readily recognize that the degree of support provided by the spacer depends in part upon the second offset distance selected in block 720, which in turn may be selected based upon a first offset distance corresponding to the desired distance between the shelf and the support surface. In certain embodiments, such as those in which the spacer is to be formed of a compliant material, block 720 may involve selecting the second offset distance as greater than the first offset distance such that the spacer slightly deforms during installation, thereby ensuring a snug fit. In certain embodiments, the selecting of block 720 may involve selecting the second offset distance as equal to the first offset distance. It is also contemplated that the selecting of block 720 may involve selecting the second offset distance to be less than the first offset distance. While such a selection may increase the amount of play for the lock cylinder, such selection may be merited for manufacturing concerns, such as tolerance accommodation.

Figure 13:
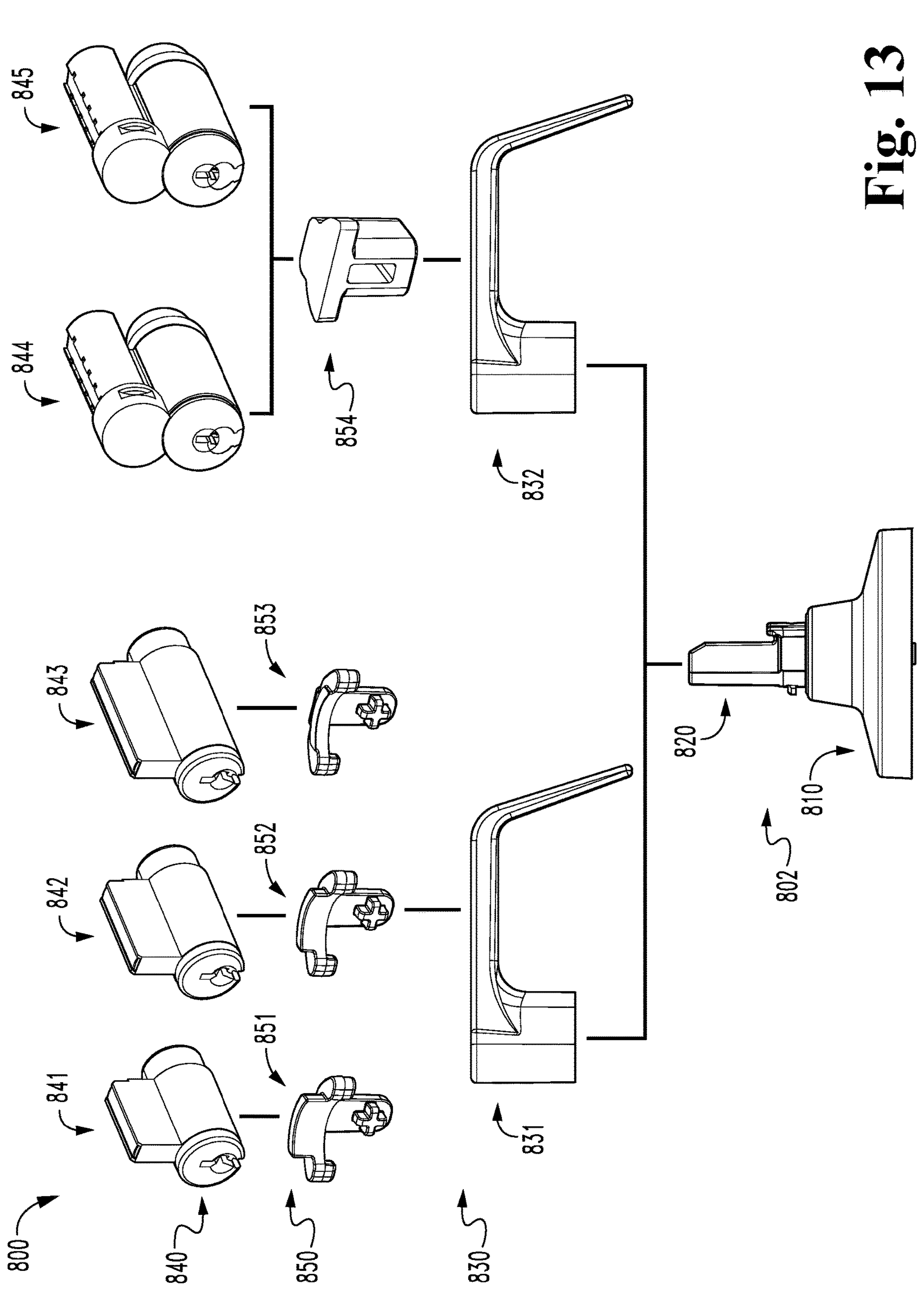
FIG. 13 is a schematic representation of a product line system according to certain embodiments.

With additional reference to FIG. 13, illustrated therein is a product line system 800 according to certain embodiments. The product line system 800 may be utilized to create handlesets of varying configurations, such as the KIL format handleset 200 and/or the IC format handleset 500. The product line system 800 generally includes a common platform 802 including a housing 810 and a spindle 820, and further includes at least one handle configuration 830, a plurality of lock cylinder configurations 840, and a plurality of spacer configurations 850. As described herein, the plurality of lock cylinder configurations 840 may include one or more IC format lock cylinder configurations. Although two full size interchangeable core (F SIC) configurations 844, 845 are illustrated, it is also contemplated that the product line system 800 may utilize one or more small format interchangeable core (SFIC) configurations in addition or as an alternative to the illustrated FSIC configurations.

The common platform 802 is configured to be used across several handleset configurations, and generally includes a housing 810 and a spindle 820. The housing 810 may, for example, be provided in the form of the above-described housing 210 and/or the above-described housing 510, which may be identical in certain embodiments. Similarly, the spindle 820 may, for example, be provided in the form of the above-described spindle 220 and/or the above-described spindle 520, which may be identical in certain embodiments.

The product line system 800 includes at least one handle configuration 830, and in the illustrated form includes a first handle configuration 831 and a second handle configuration 832. The first handle configuration 831 is a KIL-format handle configuration, and the second handle configuration 832 is an IC-format handle configuration (e.g., an SFIC configuration or an FSIC configuration). While the illustrated system 800 includes a single KIL-format handle configuration 831 and a single IC-format handle configuration 832, it is also contemplated that the system 800 may include more KIL-format handle configurations, more IC-format handle configurations, and/or may omit one of the KIL-format configuration 831 or the IC-format configuration 832. As one example, a first IC-format handle configuration may be configured for use with a first IC-format lock cylinder configuration, and a second IC-format handle configuration may be configured for use with a second IC-format lock cylinder configuration. By way of illustration, the retention notches for the IC-format lock cylinder configurations may be in different locations and/or have different geometries from one another. In certain embodiments, the SFIC spacer may be the same as or similar to the KIL spacer, and the FSIC spacer may be different from the SFIC/KIL spacer.

The system 800 includes a plurality of lock cylinder configurations 840, and in the illustrated form includes three KIL-format lock cylinder configurations 841, 842, 843 and two IC-format lock cylinder configurations 844, 845. Each of the KIL-format lock cylinder configurations 841, 842, 843 has a different tower length. While the illustrated system 800 includes a three KIL-format lock cylinder configurations 841, 842, 843 and two IC-format lock cylinder configurations 844, 845, it is also contemplated that the system 800 may include more or fewer KIL-format lock cylinder configurations and/or more or fewer IC-format lock cylinder configurations.

The system 800 includes a plurality of spacer configurations 850, and in the illustrated form includes three KIL-format lock spacer configurations 851, 852, 853 and one IC-format spacer configurations 854. Each of the KIL-format spacer configurations 851, 852, 853 has a different offset distance selected to complement the offset distance of a corresponding one of the KIL-format lock cylinder configurations 841, 842, 843, and an attachment feature configured to mate with a corresponding attachment feature of the spindle 820.

It should be appreciated from the foregoing that the system 800 may be utilized to create handlesets of varying configurations, such as the handleset 200 and/or the handleset 500. For example, a first KIL-format handleset corresponding to the KIL-format handleset 200 may include the common platform 802, the KIL-format handle 831, the first KIL-format lock cylinder configuration 841, and the first KIL-format spacer configuration 851, and a second KIL-format handleset corresponding to the KIL-format handleset 200 may include the common platform 802, the KIL-format handle 831, the second KIL-format lock cylinder configuration 842, and the second KIL-format spacer configuration 852. Similarly, a first IC-format handleset corresponding to the IC-format handleset 500 may include the common platform 802, the IC-format handle 832, the first IC-format lock cylinder configuration 844, and the IC-format spacer configuration 854, and a second IC-format handleset corresponding to the IC-format handleset 500 may include the common platform 802, the IC-format handle 832 (or a second configuration of IC-format handle), the second IC-format lock cylinder configuration 845, and the IC-format spacer configuration 854.

Figure 14:
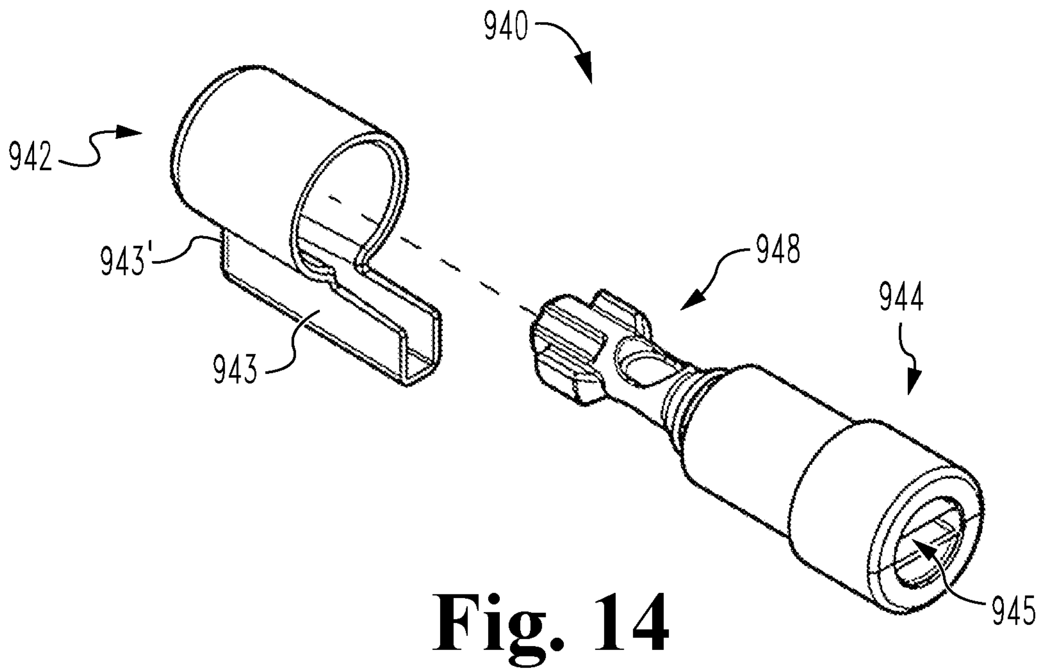
FIG. 14 is an exploded assembly view of a release mechanism according to certain embodiments.
Figure 15:
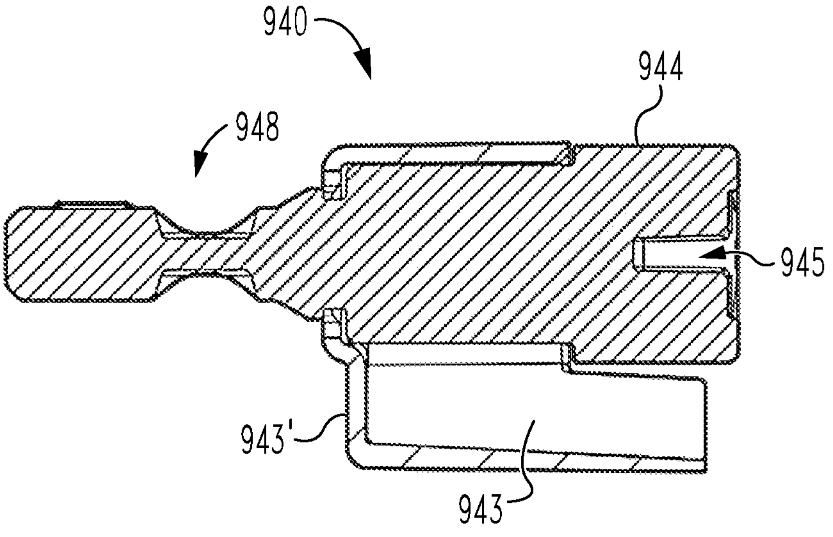
FIG. 15 is a cross-sectional view of the release mechanism illustrated in FIG. 14.

With additional reference to FIGS. 14 and 15, illustrated therein is a lock actuator in the form of a release mechanism 940 that may be utilized in connection with certain embodiments. By way of example, the release mechanism 940 may be utilized as the lock actuator in place of the above-described lock cylinders. The release mechanism 940 generally includes a shell 942, a plug 944 rotatably mounted in the shell 942, and a tailpiece 948 connected with the plug 944. In the illustrated form, the shell 942 includes a tower 943 having a distal support surface 943'.

In contrast to the lock cylinder 240, which is a secure lock actuator that requires an appropriate key for actuation thereof, the release mechanism 940 lacks a tumbler assembly, and is provided in the form of an unsecure lock actuator that can be actuated without the use of a key. For example, the illustrated plug 944 includes a recess 945 operable to receive a tip of a tool by which the plug 944 may be rotated. It is also contemplated that the plug 944 may instead include a protrusion such that the plug 944 may be rotated by hand, such as for use in hospital settings. In further embodiments, a release mechanism may include a slider and a cam that translates axial motion of the cam to rotational movement of a tailpiece. Those skilled in the art will readily appreciate that the spacers described herein may be utilized to reduce unwanted movement of the release mechanism 940 in a manner analogous to that described above with reference to reducing unwanted movement of the lock cylinders.

Although certain concepts relating to spacers have been described herein with reference to a cylindrical format lockset 100, it should be appreciated that these concepts may be utilized with locksets of other formats, such as the tubular format, the mortise format, and hybrid formats. Moreover, these concepts are not limited to use in locksets, but may be used in connection with other forms of access control device that utilize lock cylinders, such as exit devices and deadbolt assemblies.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A handleset, comprising:

a housing;

a spindle rotatably mounted to the housing for rotation about a longitudinal axis, the spindle comprising an aperture;

a lock actuator mounted in the spindle;

a handle mounted to the spindle; and a spacer removably coupled to the spindle, the spacer comprising:

a protrusion releasably engaged with the aperture via a frictional interference fit; and a ledge restricting movement of the lock actuator; and wherein the protrusion is configured to exit the aperture in response to movement of the spacer in a direction transverse to the longitudinal axis.

2. The handleset of claim 1, wherein the protrusion is formed of a plastic material and/or an elastomeric material.

3. The handleset of claim 1, wherein the spacer is formed of a plastic material and/or an elastomeric material.

4. The handleset of claim 1, wherein the spindle comprises a slot through which a tower of the lock actuator extends, and a shelf that at least partially defines the slot; and wherein the ledge is positioned between the tower and the shelf.

5. A kit comprising the handleset of claim 1, the kit further comprising a second spacer;

wherein the protrusion is offset from the ledge by a first offset distance; and wherein the second spacer comprises:

an additional protrusion operable to releasably engage with the aperture; and a second ledge offset from the additional protrusion by a second offset distance different from the first offset distance.

6. An access control device, comprising:

a mounting location;

a first attachment feature;

a lock actuator mounted in the mounting location, the lock actuator comprising a shell and a plug mounted in the shell for rotation about a longitudinal axis; and a spacer, comprising:

a second attachment feature releasably coupled with the first attachment feature, thereby preventing longitudinal movement of the spacer relative to the first attachment feature; and a ledge restricting longitudinal movement of the lock actuator; and wherein the second attachment feature is configured to disengage from the first attachment feature in response to movement of the spacer in a direction transverse to the longitudinal axis.

7. The access control device of claim 6, further comprising a spindle; and wherein the spindle comprises the mounting location.

8. The access control device of claim 7, wherein the spindle further comprises the first attachment feature.

9. The access control device of claim 6, further comprising an additional spacer, the additional spacer comprising an additional second attachment feature and an additional ledge;

wherein the additional second attachment feature is operable to releasably mate with the first attachment feature;

wherein the second attachment feature is offset from the ledge by a first offset distance;

wherein the additional second attachment feature is offset from the additional ledge by a second offset distance; and wherein the first offset distance and the second offset distance are different from one another.

10. The access control device of claim 6, further comprising a lock mechanism engaged with the lock actuator such that the lock actuator is operable to transition the lock mechanism between a locked state and an unlocked state.

11. The access control device of claim 6, wherein the access control device comprises a handleset comprising a housing, a spindle rotatably mounted to the housing, and a handle releasably coupled with the spindle;

wherein the spindle and/or the handle at least partially define the mounting location; and wherein the spindle and/or the handle at least partially define the first attachment feature.

12. The access control device of claim 6, wherein the first attachment feature and the second attachment feature are releasably coupled via a frictional interference fit.

13. A kit, comprising:

an access control device comprising an attachment feature and a mounting location operable to receive each of a first lock actuator and a second lock actuator, wherein each of the first lock actuator and the second lock actuator comprises a corresponding and respective shell and a corresponding and respective plug mounted in the shell for rotation about a longitudinal axis, wherein each shell comprises a corresponding and respective tower having a corresponding and respective tower length, and wherein the tower length of the first lock actuator is greater than the tower length of the second lock actuator;

a first spacer comprising a first spacer attachment feature operable to engage the attachment feature as a result of movement of the first spacer relative to the attachment feature in a direction transverse to the longitudinal axis, and a first ledge offset from the first spacer attachment feature by a first offset distance;

a second spacer comprising a second spacer attachment feature operable to engage the attachment feature as a result of movement of the second spacer relative to the attachment feature in the direction transverse to the longitudinal axis, and a second ledge offset from the second spacer attachment feature by a second offset distance greater than the first offset distance;

wherein, with the attachment feature engaged with the first spacer attachment feature, the first ledge is operable to engage the tower of the first lock actuator to thereby restrict movement of the first lock actuator; and wherein, with the attachment feature engaged with the second spacer attachment feature, the second ledge is operable to engage the tower of the second lock actuator to thereby restrict movement of the second lock actuator.

14. The kit of claim 13, further comprising the first lock actuator and the second lock actuator.

15. The kit of claim 13, wherein each of the first spacer attachment feature and the second spacer attachment feature is configured to engage the attachment feature via a frictional interference fit.

16. The kit of claim 15, wherein each of the first spacer attachment feature and the second spacer attachment feature is formed of a compliant material.

17. The kit of claim 13, wherein each of the first spacer and the second spacer is formed of a compliant material.

18. The kit of claim 13, wherein the access control device further comprises:

a spindle comprising the mounting location; and a handle removably coupled to the spindle; and wherein the attachment feature is defined by the spindle.

19. The kit of claim 13, wherein, with the attachment feature engaged with the first spacer attachment feature, longitudinal movement of the first spacer relative to the attachment feature is prevented; and wherein, with the attachment feature engaged with the second spacer attachment feature, longitudinal movement of the second spacer relative to the attachment feature is prevented.

* * * * *